US008022299B2

(12) United States Patent
Zheng

(10) Patent No.: US 8,022,299 B2

(45) Date of Patent: Sep. 20, 2011

(54) ROTATORY EMERGENCY STOP COVER WITH PLUG-IN UNIT

(75) Inventor: Chun Kai Zheng, Yueqing (CN)

(73) Assignee: Zhejiang Kedu Electric Mfg. Co. Ltd, Zhejiang (CN)

( * ) Notice: Subject to any disclaimer, the term of this patent is extended or adjusted under 35 U.S.C. 154(b) by 469 days.

(21) Appl. No.: 12/274,318

(22) Filed: Nov. 19, 2008

(65) Prior Publication Data

US 2009/0126431 A1 May 21, 2009

Related U.S. Application Data

(60) Provisional application No. 60/989,177, filed on Nov. 20, 2007.

(51) Int. Cl.
*H02G 3/14* (2006.01)

(52) U.S. Cl. .............. 174/67; 174/66; 70/455; 312/328; 361/170; 200/334

(58) Field of Classification Search .................... 174/66, 174/67; 70/455; 220/241, 242; 312/328; 361/170; 318/445; 200/51 LM, 334, 538; 362/276; 368/10

See application file for complete search history.

(56) References Cited

U.S. PATENT DOCUMENTS 3,714,804 A * 2/1973 French ............................ 70/419
4,023,388 A * 5/1977 Morvai ........................... 70/455
4,915,638 A 4/1990 Domian
4,970,349 A 11/1990 Jones
4,979,634 A 12/1990 Begley
5,243,135 A 9/1993 Shotey
5,280,135 A 1/1994 Berlin et al.
5,389,740 A 2/1995 Austin
6,198,046 B1 3/2001 Moodie
6,444,906 B1 9/2002 Lewis
6,457,843 B1 10/2002 Kester et al.
6,519,208 B2 2/2003 DeVries
6,649,838 B1 11/2003 Lopez, Sr. et al.
6,680,449 B1 * 1/2004 Wang ............................ 200/334
6,730,845 B1 5/2004 Criniti et al.
6,737,576 B1 5/2004 Dinh
7,709,735 B2 * 5/2010 Vigorito et al. ................. 174/67

* cited by examiner

*Primary Examiner* — Dhiru R Patel

(74) *Attorney, Agent, or Firm* — Brian D. Smith P.C.

(57) ABSTRACT

A kind of rotatory emergency stop cover with plug-in unit includes lock cover 11 having shutter 9 that contains raised block b and return spring inside, lock base 15 having groove a, stop button 4 having torsional spring; lock cover has cam 8 and torsional spring, stop button 4 has retainer 3 and plug-in unit that is passing through stop button 4 to go into cam 8 for the connection of stop button 4 to cam 8. Shape and size of unit 1 are adjusted to woke in with that of cam 8 for only use in plug-in unit 1. Plug-in unit is operable to actuate and separate synchronously stop button 4 from cam 8 to ensure that stop button 11 won't open if plug-in unit is not inserted after locking. Support plate 13 has additional hole b, with rectangular hole c being on lock cover 7; it is convenient for user to secure with a lock without removal of unit when lock cover 11 is operated. Stop button 4 has retainer 3, retainer is used to cover hole g to prevent foreign objects from falling into after removal of plug-in unit 1.

11 Claims, 7 Drawing Sheets

X Detail

ROTATORY EMERGENCY STOP COVER WITH PLUG-IN UNIT

FIELD OF THE INVENTION

This practicable, distinctive and novel approach relates to rotatory emergency stop covers, and in particular, to a kind of rotatory emergency stop cover with plug-in unit.

BACKGROUND OF THE INVENTION

A kind of rotatory emergency stop cover with plug-in unit includes lock cover having shutter, lock base having groove, stop button; lock cover has cam, movement of stop button will bring shutter to move. Front end of shutter is inserted groove for together connection of lock cover to lock base when emergency stop cover is in the lock position. Because unit is not available for existing emergency stop cover, users need another lock to lock it, ensuring that emergency stop button won't open after shutter is secured to groove of lock base. In addition, existing groove is through-hole type. Emergency stop cover opens by means of directly pushing shutter at the time when it's not locked up with a lock, so it's not convenient and safe for existing emergency stop covers.

BRIEF SUMMARY OF THE INVENTION

To overcome existing shortcomings, rotatory emergency stop cover with plug-in unit is available for this practicable and novel approach and used with one key itself. Stop cover won't open when key is removed after shutter is secured to groove of lock base; shutter is caused to move by movement of unit, emergency stop cover opens only when unit is inserted. However, because plug-in unit is special use, only applying to corresponding emergency stop button. Meanwhile, it has lock hole itself which is convenient for user to secure plug-in unit with a lock without removal of plug-in unit.

Thereby, the approach of the present invention to resolve this problem is that connection of plug-in unit will cause stop button and cam to actuate and separate at one time to ensure that stop button won't open without insertion of plug-in unit after locking. Rotatory emergency stop cover includes lock cover having shutter that contains raised block and return spring inside, lock base having groove a, stop button having torsional spring; lock cover has cam and torsional spring, stop button has retainer and plug-in unit that is passing through stop button to go into cam for the connection of stop button to cam. Working plane of cam is accessible to raised block of shutter. Retainer is assembled on emergency stop button, raise block on cam is depressed against shutter to move backwardly when rotating emergency stop button or plug-in unit anticlockwise.

After shutter is secured to groove, removal of plug-in unit will separate stop button from cam such that they are not operable, at this time, rotating stop button will not cause emergency stop cover to open for locking; shutter is to be moved as a result of rotation of cam driven by operating plug-in unit such that stop button cover open. User doesn't need another lock for this practicable and novel approach, with an advantage of operating conveniently, using safely and reliably, retainer is rotated at a certain angle, manually operable or machine operable, to cover hole g to prevent foreign obstacles from falling into when key is removed.

Further comments have been made for this practicable and novel approach in combination with following drawing and examples:

BRIEF DESCRIPTION OF THE DRAWING

The invention will be more readily understood by reference to the accompanying drawings wherein like reference numerals indicate like elements, and wherein reference numerals sharing the same last two digits identify similar corresponding elements throughout the various disclosed embodiments, and in which.

DETAILED DESCRIPTION OF PREFERRED EMBODIMENT

Figure 1:
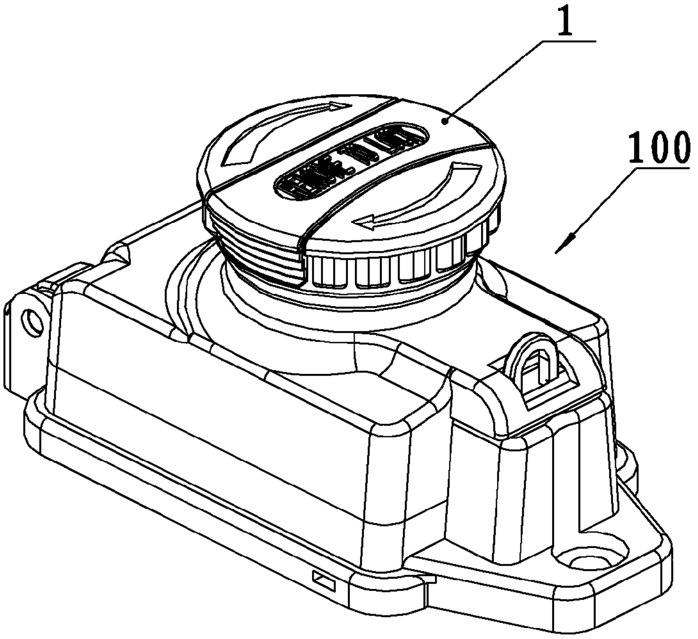
FIG. 1 is a perspective view of an rotatory emergency stop cover 100 of the present invention.
Figure 2:
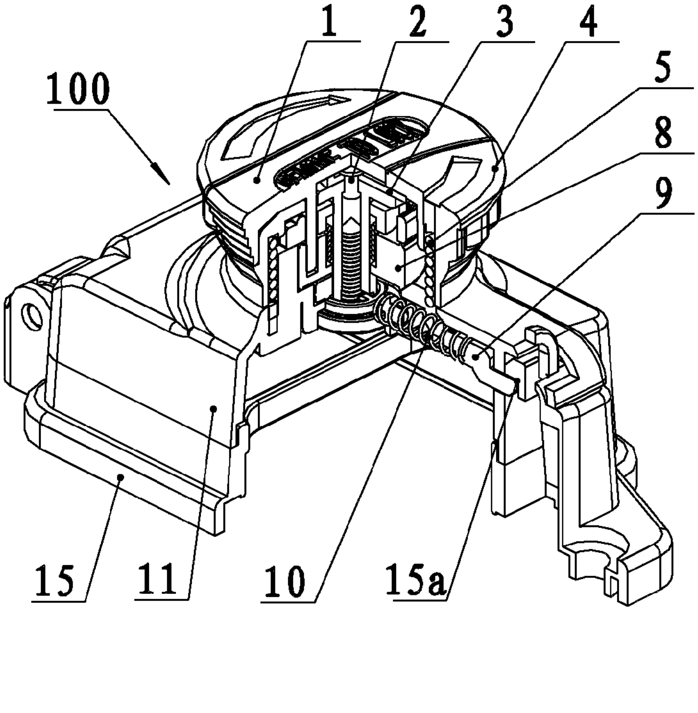
FIG. 2 is a partially broken away sectional view of the stop cover of FIG. 1.
Figure 3:
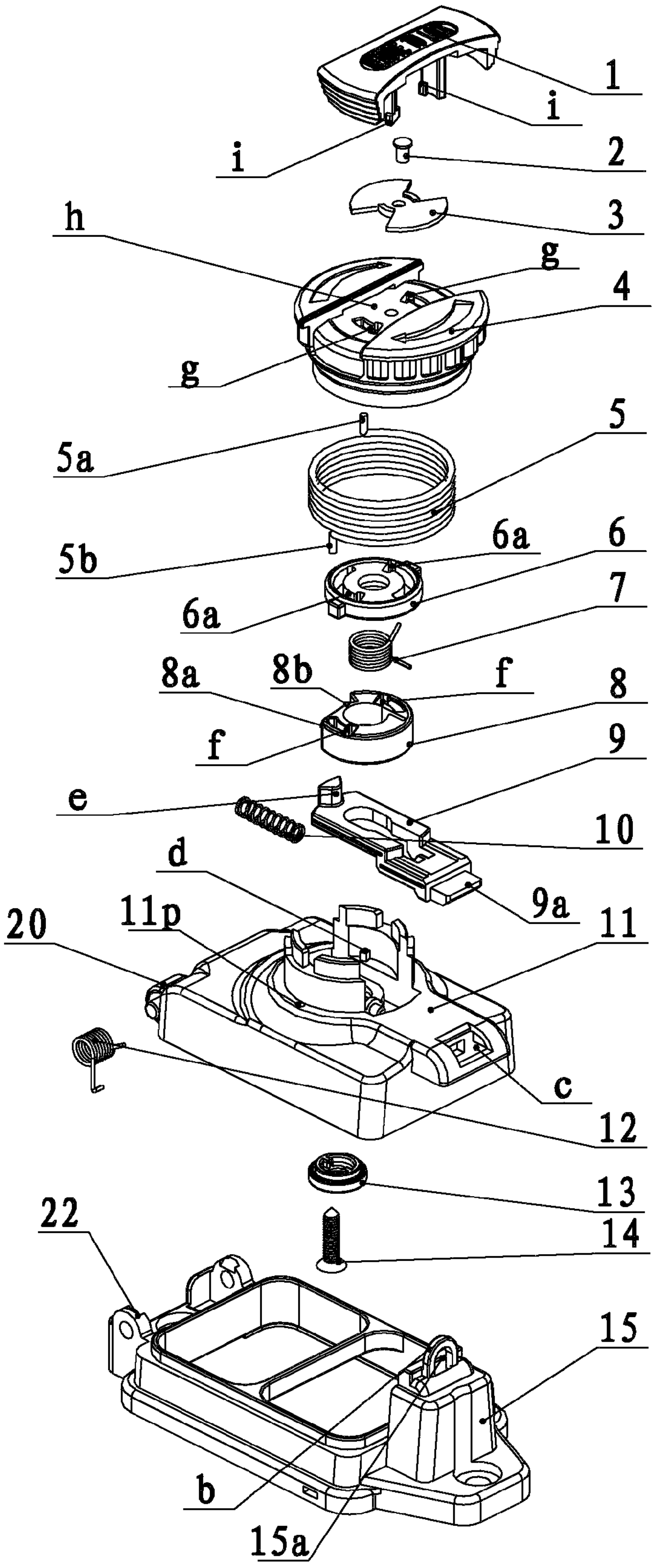
FIG. 3 is an exploded view of components of FIG. 1

FIGS. 1-3 illustrate a rotatory emergency stop cover 100 having a plug-in unit 1 which is inserted into a stop button 4 which, in turn, is rotatably mounted on a lock cover 11. Lock cover 11 has a hinge portion 20 which pivotally attaches the cover to a complementary hinge receiving portion 22 of a lock base 15. Lock base 15 also defines a hole 15*a* for receiving the front end 9*a* of a shutter 9 when the stop button 4 is in its locked position. As best shown in FIG. 3, stop button 4 is attached to one end 5*a* of a torsional spring 5 with its other end 5*b* of spring 5 secured to lock cover 11 in hole 11*p*. In addition, stop button 4 has groove h and a pair of holes g for receiving a pair of pins i of plug-in unit 1 which pass through stop button 4 and into a pair of holes f of a cam 8 to connect stop button 4 to cam 8. As also shown, shutter 9 has a raised block e while lock cover 11 receives cam 8 and a torsional spring 7. In addition, it will be appreciated that the inclined working plane 8*a* of cam 8 is accessible to raised block e of shutter 9. Shutter 9 also cooperates with a return spring 10 which biases the shutter towards its closed position. Of course, plug-in unit 1 and cam 8 are shaped and sized so that they cooperate properly with each other.

For accurate positioning of cam 8, lock cover 11 has a cam flange d which receives cam 8 which, in turn, is depressed by pressure plate 6 which defines a pair of holes 6*a*. Pins i of plug-in unit 1 pass through stop button 4 as previously discussed and also through holes 6*a* of the pressure plate and then into cam 8 to connect the stop button to cam 8.

Figure 4:
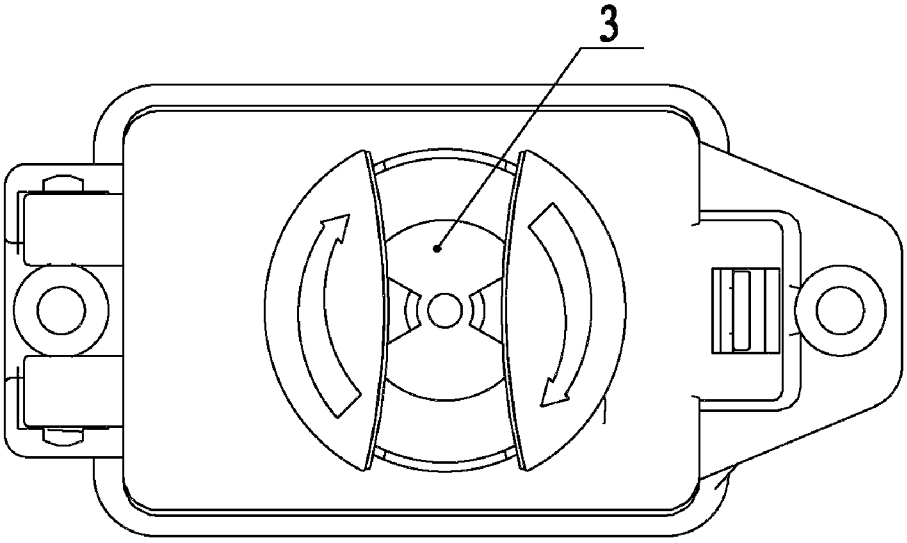
FIG. 4 is a top plan view of the rotatory emergency stop cover 100 of FIG. 1 with plug-in unit 1 removed showing retainer 3 covering holes g.
Figure 5:
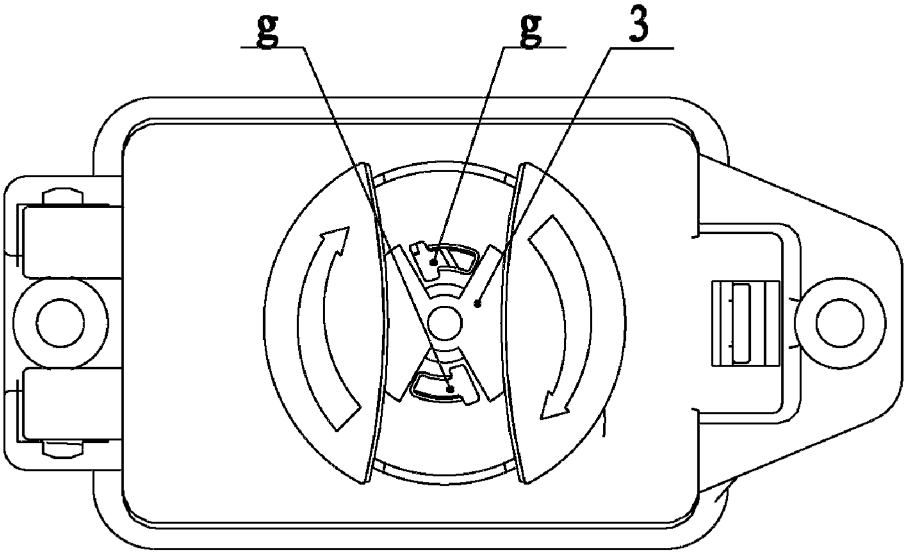
FIG. 5 is a view similar to FIG. 4 showing retainer 3 in a position where it is not covering holes g.

Stop button 4 is held onto lock cover 11 by a retainer 3 which is secured to cover 11 by a rivet 2. Retainer 3 is rotated at a certain angle to cover holes g of the stop button. (see FIGS. 4 and 5) Lock base 15 also has a rib b defining a hole 15*a*. As will be appreciated, rib b is received in an opening c of the lock cover. A padlock (not shown) may be inserted through hole 15*a* of rib b to lock cover 11 to lock base 15 conventionally.

Figure 6:
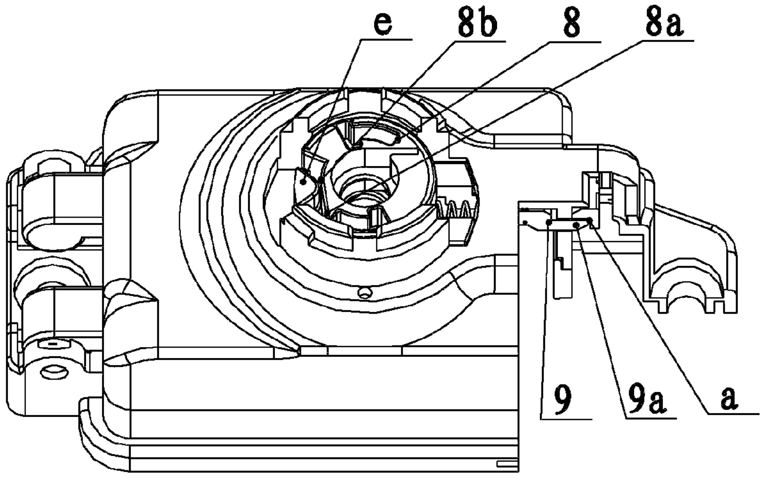
FIG. 6 is a inside view before rotating cam 8
Figure 7:
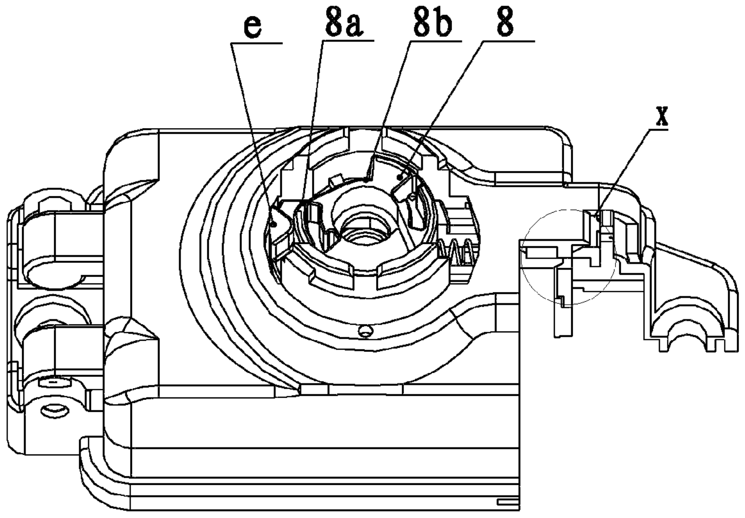
FIG. 7 is a inside view after rotating cam 8
Figure 8:
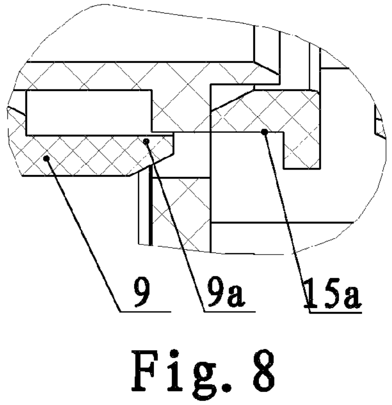
FIG. 8 is a detailed view X of FIG. 7
Figure 9:
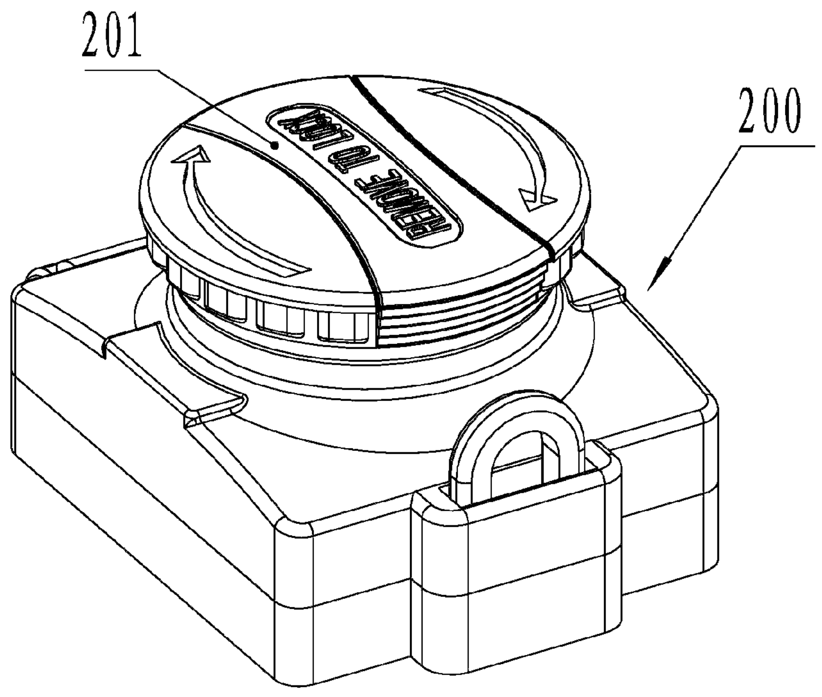
FIG. 9 is a perspective view of a second embodiment of a rotatory emergency stop cover 200 of the present invention.
Figure 10:
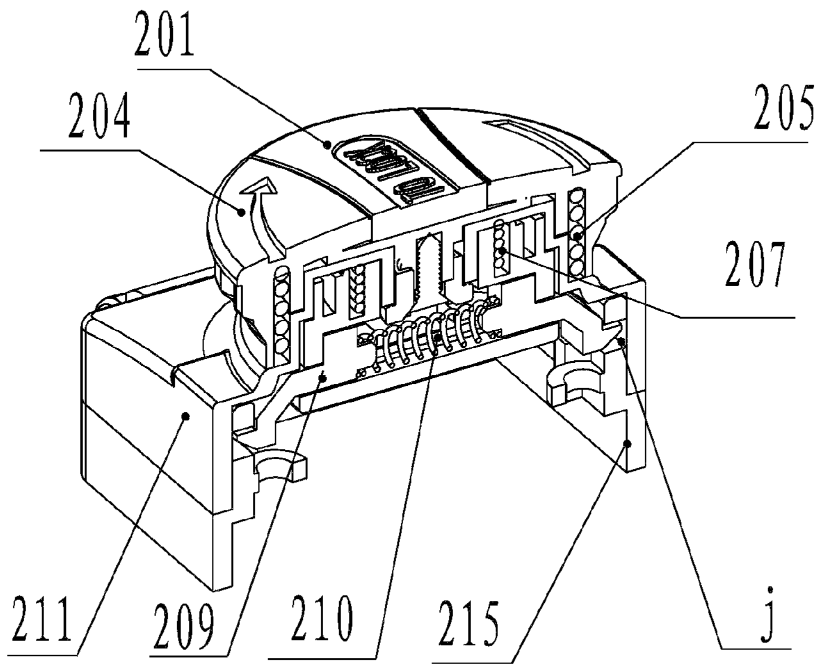
FIG. 10 is a sectional view of the stop cover of FIG. 9.
Figure 11:
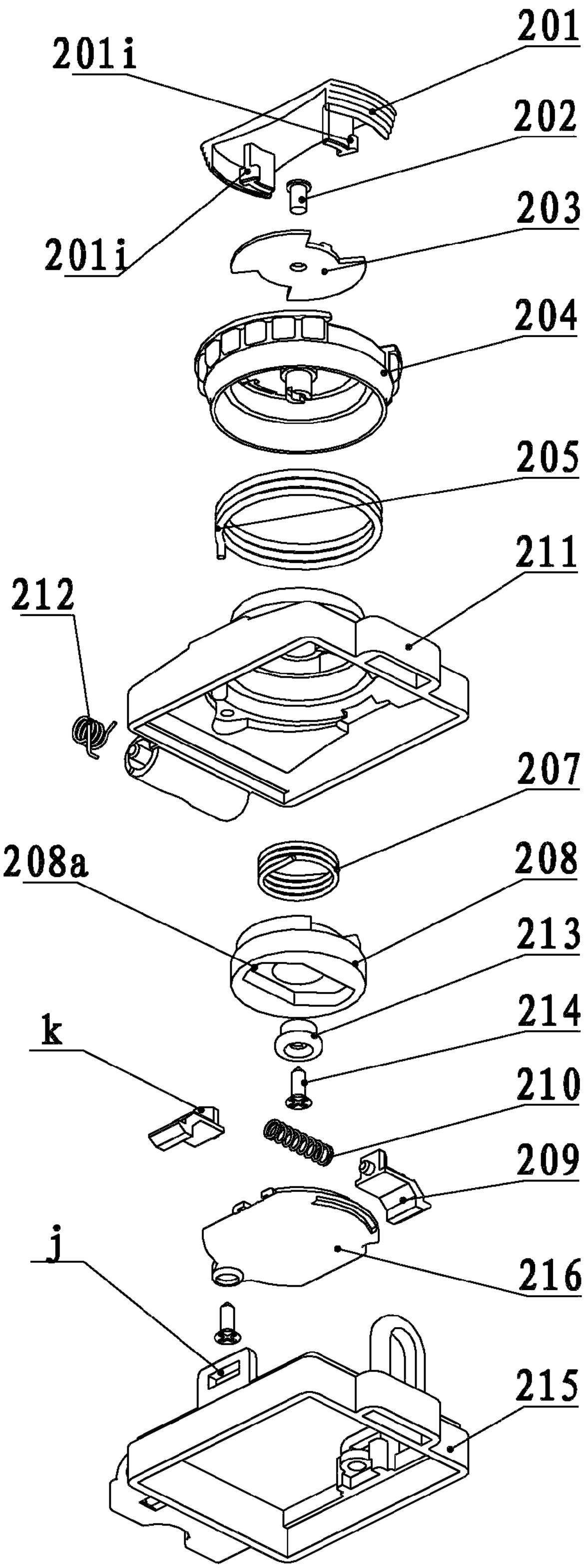
FIG. 11 is an exploded perspective view of components of the stop cover of FIG. 9 showing the underside of the components.
Figure 12:
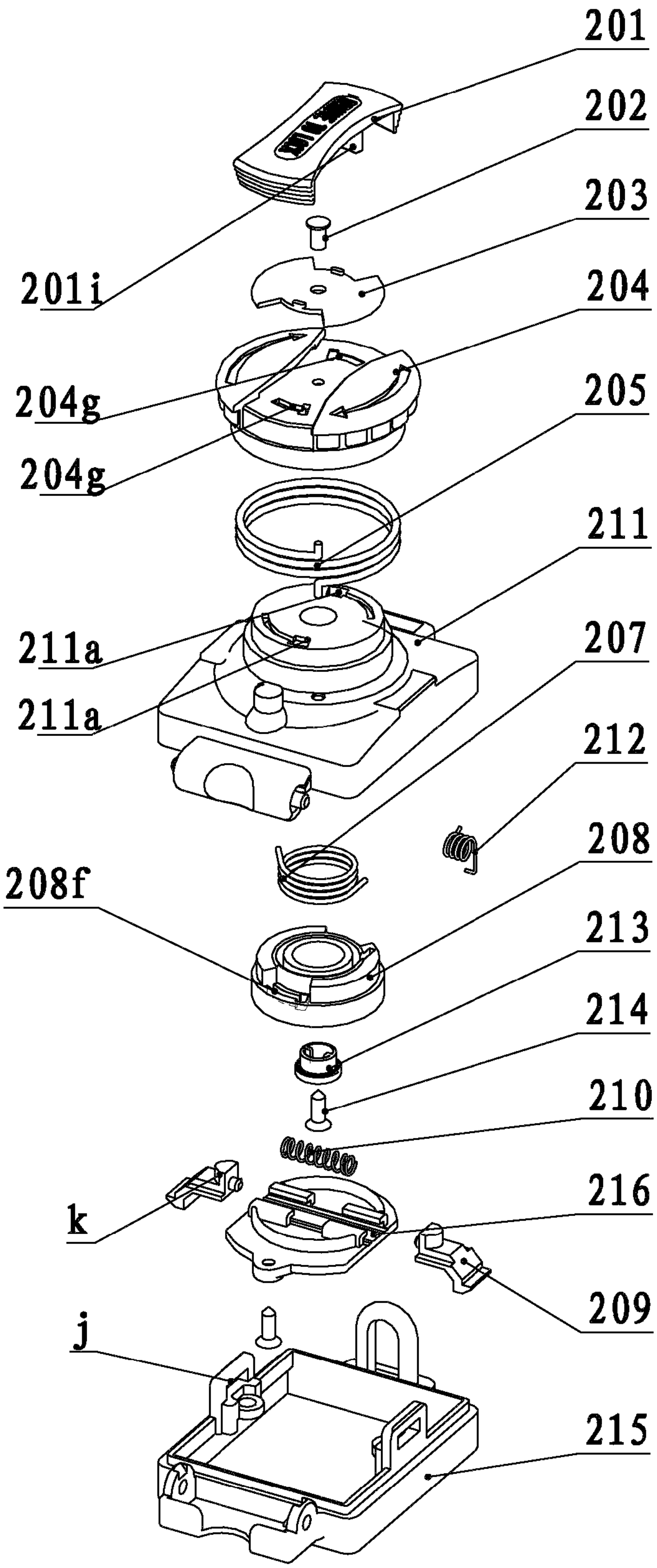
FIG. 12 is an exploded perspective view of components of the stop cover of FIG. 9 showing the topside of the components.

When stop button 4 and inserted plug-in unit 1 are rotated counterclockwise (i.e. in the direction opposite that of the arrow on the top of stop button 4), cam 8 and the connecting plug-in unit rotate together against the force of torsional spring 5. Shutter 9 ensures that cam face 8*b* is always closer to raised block e under return spring 10 pressure as shown in FIG. 6. As such, cam 8 will depress and push against the raised block e which causes shutter to overcome the force of torsional spring 5 and move out of groove a, thereby opening the stop button which will spring open under the force of hinge spring 12.

Upon release (clockwise movement) of the stop button, cam 8 moves back to its previous position under the opposing force of torsional spring 7 so that the front end 9*a* of the shutter seats back in groove a of the lock base. Also, when the plug-in unit 1 is removed, cam 8 disengages the stop button which prevents the cam from rotating when the stop button is rotated even if the stop button is depressed. As such, the front end 9*a* of the shutter will remain seated in groove a of lock base 15 to lock the stop button to the lock base, thereby preventing the cover from opening.

In the second embodiment illustrated in FIGS. 9-12, a rotatory emergency stop cover 200 operates in a manner similar to that of the first embodiment with the exception that a pair of shutters 209 are provided on both sides, along with a pair of grooves j on both sides of lock cover 211. Cam 208 has two working planes 208*a* that are symmetrical. In addition, plug-in unit 201 has pins 201*i* which pass through holes 204*g* of stop button 204 and holes 211*a* of lock cover 211, into through holes 208*f* of cam 208 to connect stop button 204 to plug-in unit 201 and plug-in unit 201 to cam 208. Cam 208 comes in contact with raised block k on shutters 209, respectively, when cam 208 is rotated. This rotation of cam 208 depresses and pushes against raised blocks k which causes shutters 209 to overcome the pressure of return spring 10 and back shutters 209 out of grooves j, thereby allowing the stop cover to open. Cam 208 contains internal cam 208*a* and external cam.

The invention has been described in detail with reference to particular embodiments thereof, but it will be understood that various other modifications can be effected within the spirit and scope of this invention.

I claim:

1. A rotatory emergency stop cover comprises a lock cover, a shutter that contains a raised block, a return spring, a lock base having a groove, and a stop button having a first torsional spring; said lock cover also having a cam and a second torsional spring, said stop button has a retainer and a plug-in unit that passes through said stop button and extends into said cam to connect said stop button to said cam, and wherein a working plane of said cam is accessible to said raised block of said shutter.

2. The rotatory emergency stop cover according to claim 1 wherein said stop button has a groove h and a hole g, and wherein said plug-in unit has a pin i passing through a hole g of said stop button to go into a hole f of said cam for connection of said stop button to said cam, and wherein said stop button opens by means of connection of said plug-in unit when said stop button and said plug-in unit are rotated and said plug-in unit is removed, and wherein said cam disengages said stop button so that said cam is prevented from rotating when said stop button rotates, even if so, when said stop button is depressed, said shutter is still secured to said groove of said lock base to lock up said stop button, thereby preventing said stop button from opening.

3. The rotatory emergency stop cover according to claim 1 wherein said pin i of said plug-in unit and said hole f of said cam can be shaped and sized at one time for only use.

4. The rotatory emergency stop cover according to claim 1 wherein said lock cover has a cam flange d, said cam is located in said cam flange d, and is depressed with a pressure plate with a hole 6.

5. The rotatory emergency stop cover according to claim 1 wherein said retainer is rotated at a certain angle, manually operable or machine operable to cover said hole g to prevent foreign obstacles from falling into said hole g after removal of a key.

6. The rotatory emergency stop cover according to claim 1 wherein said lock base is designed to have a lock hole for user.

7. The rotatory emergency stop cover according to claim 6 wherein said cam is an internal cam or an external cam.

8. The rotatory emergency stop cover according to claim 1 wherein said shutter is provided on the sides of said lock cover, along with grooves a on said sides of said lock cover and said cam has two working planes that are symmetrical.

9. The rotatory emergency stop cover according to claim 8 wherein said cam is an internal cam or an external cam.

10. The rotatory emergency stop cover according to claim 1 wherein said groove is enclosed on said lock base.

11. The rotatory emergency stop cover according to claim 1 wherein said cam is an internal cam or an external cam.

* * * * *